(12) United States Patent
Nilsson

(10) Patent No.: US 6,473,610 B1
(45) Date of Patent: *Oct. 29, 2002

(54) WIRELESS PREPAID TELEPHONE SYSTEM WITH DISPENSABLE INSTRUMENTS

(76) Inventor: Byard G. Nilsson, 2064 Santa Margarita Dr., Fallbrook, CA (US) 92028

( * ) Notice: Subject to any disclaimer, the term of this patent is extended or adjusted under 35 U.S.C. 154(b) by 0 days.

This patent is subject to a terminal disclaimer.

(21) Appl. No.: 09/428,002

(22) Filed: Oct. 27, 1999

Related U.S. Application Data

(63) Continuation-in-part of application No. 08/878,864, filed on Jun. 19, 1997, which is a continuation-in-part of application No. 08/955,338, filed on Oct. 21, 1997, which is a continuation-in-part of application No. 09/311,795, filed on May 13, 1999.

(51) Int. Cl.[7] .......................... H04M 1/03; H04M 11/00; H04B 1/38
(52) U.S. Cl. .................. 455/406; 455/409; 455/564
(58) Field of Search .................... 455/406, 90, 517, 455/550, 556, 563, 564, 569, 409, 565; 379/420.01, 433.1, 434, 88.01, 88.02, 88.03, 88.04

(56) References Cited

U.S. PATENT DOCUMENTS

| | | |
|---|---|---|
| 3,688,126 A | 8/1972 | Klein |
| 4,320,256 A | 3/1982 | Freeman |
| 4,475,189 A | 10/1984 | Herr et al. |
| 4,611,094 A | 9/1986 | Asmuth et al. |
| 4,731,811 A | 3/1988 | Dubus |
| 4,829,514 A | 5/1989 | Frimmel, Jr. et al. |
| 4,856,066 A | 8/1989 | Lemelson |
| 4,870,686 A | 9/1989 | Gerson et al. |
| 4,879,744 A | 11/1989 | Tasaki et al. |
| 4,969,180 A | 11/1990 | Watterson et al. |
| 5,042,063 A | 8/1991 | Sakanishi et al. |
| 5,153,902 A | 10/1992 | Buhl et al. |

(List continued on next page.)

FOREIGN PATENT DOCUMENTS

| | | | | |
|---|---|---|---|---|
| WO | WO 96/03001 | * | 2/1996 | .......... H04M/17/00 |
| WO | WO 99/14928 | | 3/1999 | |

OTHER PUBLICATIONS

Gawrys, G. W., et al., "A New Protocol for Call Handling Functions for the SPC Network," Globecom '82, IEEE Global Telecommunications Conference, Conference Record vol. 2 of 3, Miami, Nov. 29 to Dec. 2, 1982, pp. 735–738.

Dorros, Irwin, "Evolving Capabilities of the Public Switched Telecommunications Network," Business Communications Review, Jan.–Feb. 1981, pp. 4–11.

Primary Examiner—Dwayne Bost
Assistant Examiner—Miguel D. Green

(57) ABSTRACT

A telecommunication system incorporates individual station instruments simplified by wireless operation, voice dialing, prepaid accounting and out-call operation, all enabled by cooperative system operation including supporting central equipment. Wireless operation of the central equipment involves a multiple port wireless platform along with other units for interfacing a multitude of mobile station instruments simultaneously for interactive audio communication to, regulate control, monitor and record operations of the instruments, and bridge communication with selected remote terminals through the public switched telephone network. Message capability, emergency abort to an operator station and security features supplement the basic system. Communication is controlled for the individual instruments to be either voice or dial-up signals. Voice recognition units alternatively are located in the central equipment and/or the individual station instruments and controlled accordingly. Manual control at instruments accommodates either voice or number outgoing communication.

18 Claims, 7 Drawing Sheets

U.S. PATENT DOCUMENTS

| | | | |
|---|---|---|---|
| 5,203,009 A | * | 4/1993 | Bogusz et al. .............. 455/33.1 |
| 5,222,121 A | | 6/1993 | Shimada |
| 5,195,090 A | | 9/1993 | Bolliger et al. |
| 5,274,695 A | | 12/1993 | Green |
| 5,297,183 A | | 3/1994 | Bareis et al. |
| 5,297,194 A | | 3/1994 | Hunt et al. |
| 5,353,335 A | | 10/1994 | D'Urso et al. |
| 5,353,336 A | | 10/1994 | Hou et al. |
| 5,369,685 A | | 11/1994 | Kero |
| 5,377,256 A | | 12/1994 | Franklin et al. |
| 5,420,912 A | | 5/1995 | Kopp et al. |
| 5,440,620 A | | 8/1995 | Slusky |
| 5,450,479 A | | 9/1995 | Alesio et al. |
| 5,461,664 A | | 10/1995 | Cappadona |
| 5,499,288 A | | 3/1996 | Hunt et al. |
| 5,509,049 A | * | 4/1996 | Peterson ................ 379/213.01 |
| 5,509,060 A | | 4/1996 | Hall et al. |
| 5,541,977 A | | 7/1996 | Hodges et al. |
| 5,574,771 A | | 11/1996 | Driessen et al. |
| 5,592,535 A | * | 1/1997 | Klotz .......................... 455/406 |
| 5,602,900 A | | 2/1997 | Hattori |
| 5,640,689 A | * | 6/1997 | Rossi .......................... 455/129 |
| 5,659,597 A | | 8/1997 | Bareis et al. |
| 5,710,813 A | | 1/1998 | Terui et al. |
| 5,719,926 A | | 2/1998 | Hill |
| 5,754,645 A | | 5/1998 | Metroka et al. |
| 5,778,313 A | | 7/1998 | Fougnies |
| 5,790,636 A | | 8/1998 | Marshall |
| 5,797,101 A | | 8/1998 | Osmani et al. |
| 5,802,466 A | | 9/1998 | Gallant et al. |
| 5,812,945 A | | 9/1998 | Hansen et al. |
| 5,815,807 A | | 9/1998 | Osmani et al. |
| 5,826,185 A | | 10/1998 | Wise et al. |
| 5,828,738 A | | 10/1998 | Spaeth |
| 5,832,371 A | | 11/1998 | Thornton |
| 5,835,570 A | | 11/1998 | Wattenbarger |
| 5,845,218 A | | 12/1998 | Altschul |
| 5,850,599 A | | 12/1998 | Seiderman |
| 5,854,975 A | | 12/1998 | Fougnies et al. |
| 5,867,796 A | | 2/1999 | Inutsuka |
| 5,884,188 A | | 3/1999 | Hayes, Jr. |
| 5,946,613 A | * | 8/1999 | Hayes, Jr. et al. .......... 455/406 |
| 5,963,859 A | | 10/1999 | Keating |
| 5,966,654 A | | 10/1999 | Croughwell et al. |
| 6,049,710 A | | 4/2000 | Nilsson |
| 6,138,036 A | | 10/2000 | O'Cinneide |
| 6,149,353 A | | 11/2000 | Nilsson |
| 6,157,848 A | | 12/2000 | Bareis et al. |
| 6,167,118 A | | 12/2000 | Slivensky |
| 6,167,251 A | | 12/2000 | Segal et al. |
| 6,198,947 B1 | * | 3/2001 | Barber .................... 379/88.02 |
| 6,393,304 B1 | * | 5/2002 | Meche .................. 379/355.02 |
| 6,418,328 B1 | * | 7/2002 | Shon ..................... 379/355.09 |

\* cited by examiner

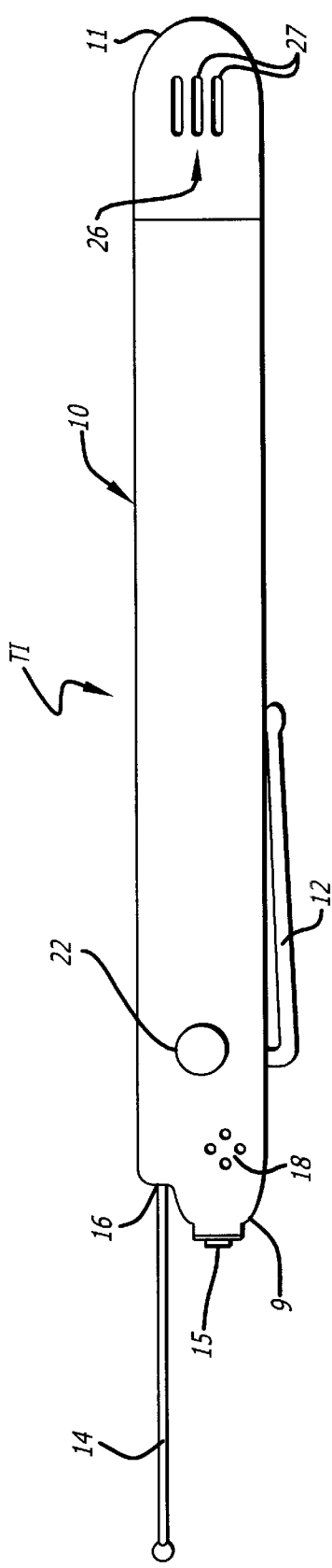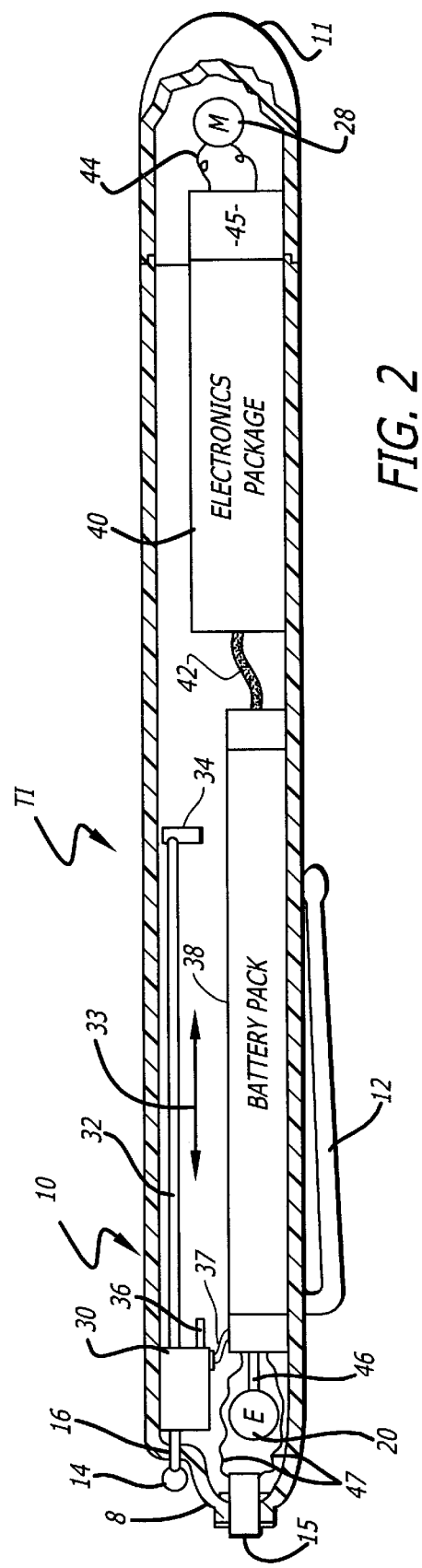

| 2746832814 | (I.D. NUMBER) | — 193 |
| 2139 | (INST. CODE) | — 194 |
| $68.50 | (CURRENT VALUE) | — 195 |
| $72.14 | (LAST VALUE) | — 196 |

*2746832814*
191

| 213 555 6666 | |
| 619 555 8011 | (CALL RECORD) | — 198 |
| 312 555 1714 | |

70A1

| 3/21/97  $50 | |
| — — — | (REFRESH RECORD) | — 200 |

| 213 555 6713   3/23/97 | |
| — — — | (MESSAGES) | — 202 |

| 213 ONLY | |
| DAY ONLY | (LIMITS) | — 204 |

| OWNER I.D. | |
| DATE OF SALE | (VALIDITY DATA) | — 206 |

*FIG. 5*

WIRELESS PREPAID TELEPHONE SYSTEM WITH DISPENSABLE INSTRUMENTS

RELATED APPLICATION INFORMATION

This application is a continuation-in-part of application Ser. No. 08/878,864 filed Jun. 19, 1997, entitled "Wireless Prepaid Telephone System With Dispensable Instruments" as well as a continuation-in-part of application Ser. No. 08/955,338 filed Oct. 21, 1997, entitled "Wireless Prepaid Telephone System With Extended Capability" and a continuation-in-part of application Ser. No. 09/311,795 filed May 13, 1999, entitled "Wireless Mobile Telephone System With Voice-Dialing Telephone Instruments And DTMF Capability."

BACKGROUND OF THE INVENTION (1) Field of the Invention

The present invention relates to mobile telecommunication and more specifically to wireless telephone systems including telephone instruments capable of being compact, inexpensive and simple as a result of integral system operation of instruments in combination with enhanced central station equipment.

(2) Background Description

In recent years, considerable progress has been made in the development of wireless telephone systems. In that regard, wireless telephone instruments, sometimes called "mobile stations" (MS) have come into widespread use, accommodated for example by geographically defined cells. Although the systems are quite effective, and have considerably enhanced telephonic communication, there are areas for improvement.

Typically in wireless systems, individual telephone instruments communicate at an initial level with central equipment, sometimes called "base stations" (BS). Operating with other components as a composite system, the geographically-separate base stations enable mobile telephone instruments to roam through different geographic areas or cells. Thus, from various locations, mobile instruments can access virtually any telephone terminal throughout the entire dial-up telephone network, sometimes called the "public switched telephone network" (PSTN). Furthermore, the users of mobile telephone instruments can roam from one cell to another in the course of a connected call.

Conventionally, a composite mobile telecommunications system includes some form of a switching system, sometimes including a unit called a "mobile switching center" (MSC). The MSC may be provided, along with other structure between the a base station (BS) and the public switched telephone network (PSTN). Accordingly, mobile management is accomplished using well known techniques and structures.

In contemporary systems, individual wireless telephone instruments usually are purchased by users in a transaction that is relatively complex. As part of the purchase transaction, the instrument is activated and numbers are assigned, however, more significantly, a financial commitment must be established for the new owner. Of course, the owner is responsible for the telephone instrument itself, however, responsibility also extends to the telephone service provided for the instrument, e. g. calls charged to the instrument.

Although considerably enhancing telephonic communication and wireless operation, current systems also have considerably increased complications and risk-of-loss to instrument owners. Under various promotional schemes, telephone marketing organizations sometimes have offered wireless instruments at a very low cost. Still, alternative charges or commitments usually are imposed. In any event, costs resulting from lost or stolen instruments or fraudulent calls ultimately must be borne at some level, usually by the consumer.

As suggested above, the risk-of-loss to the owner of a wireless telephone instrument can far exceed the value of the instrument,itself. In one aspect, the increased risk involves the threat of a stolen instrument being used to make extensive and costly calls. Adjustments may be made in the billing for such calls, however usually, not without the expense of time and aggravation to the instrument owner. Thus, the risk of physical loss presents a nagging annoyance to wireless instrument owners.

The risk of loosing a wireless telephone instrument is compounded by the fact that some wireless operation exposes critical information that can be obtained without physical access to a telephone instrument. Such information can be used to charge fraudulent calls to a wireless owner's account. Consequently, even when an instrument never leaves an owners control, the owner may be invoiced for calls fraudulently made from a cloned instrument.

Essentially, with possession of certain critical broadcast information, some wireless telephone instruments can be fraudulently cloned. That is, persons with sophisticated apparatus can intercept and use critical information that is broadcast during the routine use of a proper instrument to create a clone. The resulting clone then may be used extensively, to make long distance calls that are billed to the account of the cloned instrument. Thus, even with the exercise of great care, the owner of a wireless instrument may face substantial expense and/or inconvenience. Accordingly, a need exists for a system accommodating fewer complications, limited responsibility and restricted potential loss for the owner of an individual wireless telephone instrument.

In view of their significant value, and their manner of use, wireless telephone instruments ideally could be of a more convenient size. That is, although now very compact, further improvement is desirable, as for storage and carrying. Specifically, a need exists for wireless telephone instruments that can be simply sold and can be carried and stored with greater convenience, as in a pocket, a purse, a child's pack or an automotive compartment.

In view of the various considerations as set out above, it is apparent that a need exists for an improved, relatively less expensive wireless telephone system affording greater convenience and economy, flexibility of communication format, fewer complications and restricted risk of loss for wireless telephone instrument owners.

SUMMARY OF THE INVENTION

In part, the present invention is based on the recognition that a very simple and convenient, yet effective, wireless telephone instrument can be accommodated, by supporting such instruments with a cooperating central system. Generally, in accordance with exemplary disclosed embodiments, convenient, inexpensive, voice-actuated, prepaid, wireless telephone instruments may be provided, that involve limited complications, along with limited risk and exposure for owners.

Essentially, in accordance with the present invention a wireless telephone instrument incorporates an earphone, a microphone, a radio transceiver, a battery pack and a control unit, all embodied in a small convenient housing incorporating switching control and signaling structures. The instrument can be configured as a rod or tube similar to a writing pen.

As disclosed herein, wireless telephone instruments (embodiments hereof) operate as part of a composite system in cooperation with a central station having a multiple-port platform. The ports of the platform accommodate multiple wireless telephone instruments simultaneously. In disclosed embodiments, the users of wireless telephone instruments are prompted vocally to speak control words as well as message words. Thus, initially, communication by users at wireless telephone instruments, is in the form of voice signals generated from the user's voice.

Certain voice signals (representative of spoken words) are recognized as numbers (e. g. digits "zero" through "nine") by a voice recognition unit and may be converted to a digital form (e.g. DTMF) for control, dial-up functions and communication. Words for speech recognition also may be assigned to the "star" or "asterisk" (*) and the "pound" sign (#) signals. In the disclosed embodiment, the central station system also includes a voice generator, e. g. an audio response unit (ARU), to prompt or cue instrument users, and a control unit incorporated with a memory.

Essentially, in accordance with embodiments of the present invention, the central station interfaces many individual remote keyless and wireless telephone instruments. Voice cues or prompts are provided and signal representative of vocalized numbers (audio) are recognized to indicate a desired terminal connection as well as to authenticate or verify that a remote instrument is being properly used. The central station determines whether the instrument has adequate pre-paid value to cover a specified call. If so, the indicated communication is completed through the mobile network and the public network, with the central station monitoring the call to reflect a service charge in the prepaid balance. In accordance with one embodiment, after communication is initiated, it may proceed selectively in different formats, e.g. ultimately by using either vocal or dial-up (key pad) signals, e.g. DTMF.

With reference to current technology, the system elements of the central station may be variously embodied in a mobile network, as by modifying or supplementing a base station and/or mobile switch center. Accordingly, the system hereof may be variously incorporated in a mobile telecommunications system to accommodate dial-up select communication through a public switched telephone network.

Wireless telephone instruments in accordance herewith may involve a limited and defined pre-paid value. The simplicity of the instruments (being keyless—without a numerical keypad) enable very compact forms, as in the configuration of a fountain pen. Furthermore, in large production runs, individual instruments may be quite inexpensive, even to the extent of being discardable or disposable. Accordingly, convenient, inexpensive instruments may be produced with defined and relatively small risk of loss. Complications and obligations of ownership also may be relatively few. Various modifications are disclosed to accommodate various alternative structures and processes.

BRIEF DESCRIPTION OF THE DRAWINGS

In the drawings, which constitute apart of this specification, exemplary embodiments of the invention are set forth as follows:

FIG. 1 is a side view showing a wireless mobile telephone instrument in accordance with the present invention and for use in a system in accordance with the present invention;

FIG. 2 is a sectional view taken lengthwise through the instrument of FIG. 1;

FIG. 5 is a symbolic fragmentary diagram of a memory cell in the system of FIG. 3, for representing data on a wireless telephone instrument;

DESCRIPTION OF THE PREFERRED EMBODIMENT

Figure 3:
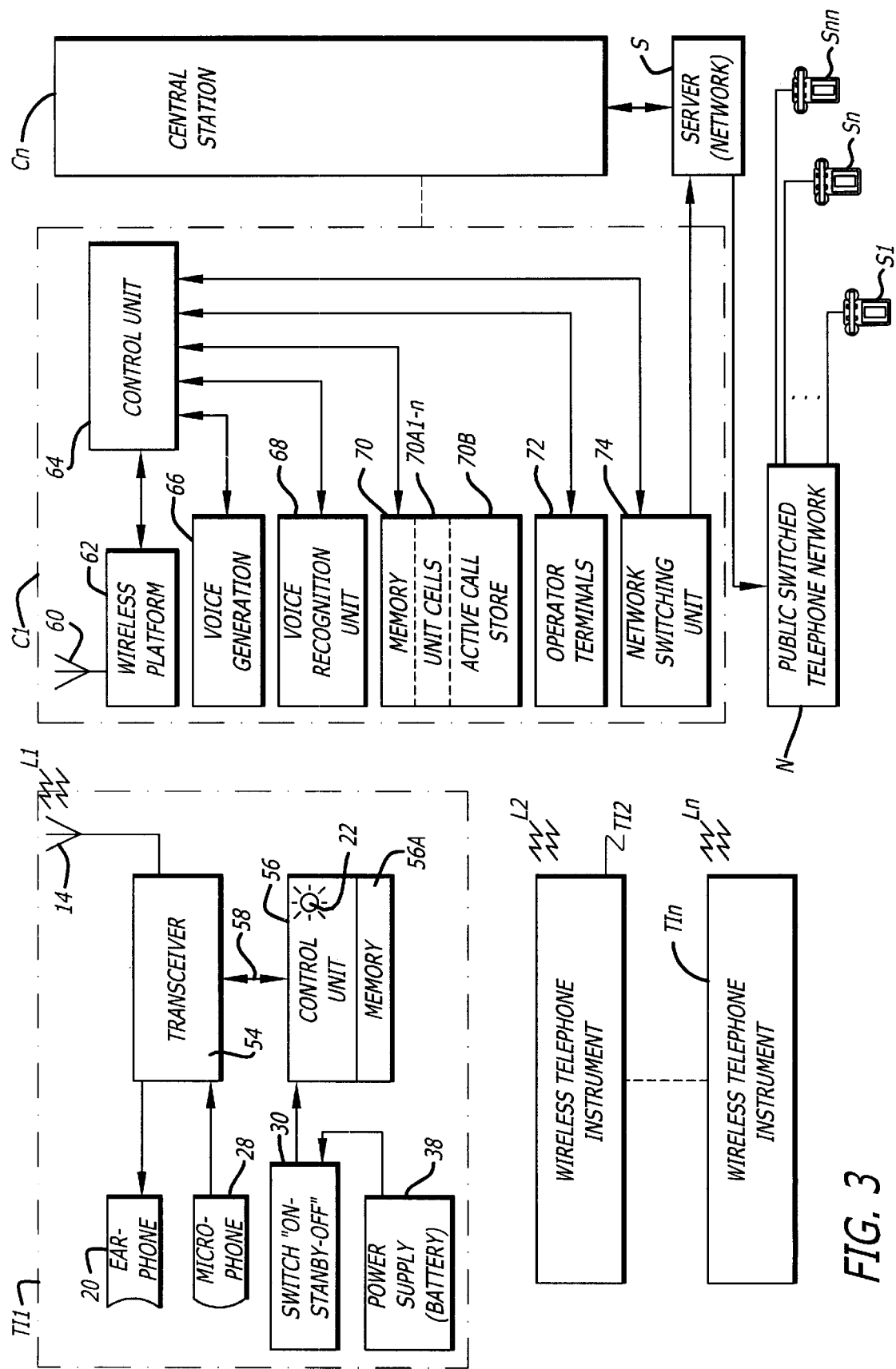
FIG. 3 is a block diagram of a system in accordance with the present invention, showing components of instruments and a central station for use with a public switched telephone network.

As indicated above, detailed embodiments of the present invention are disclosed herein. However, the embodiments are merely representative, recognizing that a wide variety of disclosed embodiments are possible utilizing a multitude of different techniques and components. Nevertheless, the disclosed embodiments are deemed to afford the best embodiments for purposes of disclosure and to provide a basis for the claims herein which define the scope of the present invention.

Referring initially to FIG. 1, a mobile station, or wireless telephone instrument TI is depicted showing some of the operating components. Specifically, the instrument TI is embodied in a tubular housing 10 with somewhat hemispherical ends 9 (left) and 11 to define a configuration that is somewhat similar to that of a writing instrument, e. g. a fountain pen.

Near the end 9 of the housing 10, a pocket clip 12 is affixed to the tubular surface extending parallel to the central axis of the housing 10. The clip may serve as a handle and accommodates convenient attachment of the instrument TI during storage.

Also apparent from the exterior of the housing 10 is an antenna 14 (FIG. 1, upper left) which is telescopically mounted either to be substantially contained in the housing 10 or to extend through a port 16, so that its major length is outside the housing 10. Note that in FIG. 1, the antenna 14 is shown partially extended from the housing 10 while in FIG. 2, it is shown contained in the housing 10.

Near the antenna port 16, at the very tip of the end 9, is a receptacle 15 for a jack (not shown) to recharge the instrument. Somewhat adjacent the receptacle 15, an array of small openings 18 penetrate the housing 10 for passing sound from an earphone 20 (FIG. 2). Mounted near the array of openings 18 is a pilot lamp 22 indicating the alternative states: "on" and "off". The switch structure for setting these states is associated with the antenna 14 and is described later with reference to FIG. 2.

Near the end 11 (FIG. 1, right) a group 26 of slots 27 penetrate the housing 10 for passing a users voice to a microphone 28 (FIG. 2). Thus, the instrument TI is configured to position the microphone 28 near a user's mouth while the earphone 20 is positioned near the user's ear. Note that the pocket clip 12 may be variously placed to attain the most universally convenient location for use as a handle.

The elemental simplicity and convenience of the keyless instrument TI are apparent, both for storage and use. To further consider the instrument TI, reference now will be made to FIG. 2 showing the interior components.

The earphone 20 and the microphone 28, mentioned above, are firmly fixed in relation to the housing 10. A switch device 30 (FIG. 2, left) is configured as a block and also is fixed in the housing 10. The switch device 30 has a dual function, specifically, it actuates the instrument and carries the antenna 14. Structurally, the switch device 30 defines a small bore (not shown) that may be keyed and which telescopically receives an elongate shaft 32 of the antenna 14. Accordingly, the switch device 30 provides a slide bearing to accommodate axial movement of the antenna 14 as indicated by an arrow 33.

When the antenna 14 is withdrawn to extend fully from the housing 10, a knob 34, located at the inner end of the antenna 14, engages a spring-biased plunger 36 extending from the switch device 30. The knob 34 forces the plunger 36 telescopically within the switch device 30 and thereby energizes the instrument TI to an "on" state. Plunger switch devices are well known and widely used in various electronic applications. Retraction of the antenna 14 releases the spring-biased plunger 36 allowing it to return to the exposed position as illustrated (FIG. 2). Accordingly, the instrument TI is de-energized to an "off" state.

As indicated above, except for the antenna 14, the internal components of the wireless telephone instrument TI are firmly fixed in the housing 10. In such fixed locations, the components are electrically interconnected to accomplish an operating electrical apparatus as described in detail below. Specifically, the switch device 30, along with the antenna 14 are coupled by a cable 37 to a power supply, e.g. battery pack 38 which also is connected to an electronics package 40 by a cable 42. Connections from the electronics package 40 also extend to the microphone 28 (wires 44) and to the earphone 20 (wires 46, partly obscured by the battery pack 38 and carried in the cable 42). The battery pack 38 also is connected to the charging receptacle 15 by wires 47.

The electronics package 40 may comprise an integrated circuit chip (not separately shown) constituting the component electronic parts as described below. These components function cooperatively to execute the process steps and operations of the instrument, also as described below.

Generally, to make a call with the instrument TI, a user simply withdraws the antenna 14 to energize the electrical components including the signal lamp 22 which is illuminated to indicate the instrument is ready for use. With the earphone 20 near the users ear, audible prompts soon are heard instructing the user to respond vocally.

Following preliminary communication with the central station (described below), a communication connection is completed from the instrument TI to a desired remote telephone terminal by spoken number words from the user. A wireless system network and the public switched telephone network accommodate such operation for a multitude of individual wireless telephone instruments TI. Generally, it is noteworthy that various forms of wireless systems are well known in the art into which the developments hereof may be variously incorporated.

Referring now to FIG. 3, a plurality of individual wireless telephone instruments TI1 through TIn are shown (FIG. 3, left). The instruments TI1–TIn may take the physical form of the instrument TI, as described with reference to FIGS. 1 and 2. Essentially, the instruments TI1–TIn are interfaced with a public switched telephone network N (FIG. 3, lower center) through central wireless stations C1 through Cn and a server S in accordance herewith.

Individually, the stations C1–Cn may serve as base radio stations for different geographic areas and may be managed by the server S to accommodate roaming by the instruments TI1–TIn as well known in the art. Details of the wireless management and server functions are well known and consequently are not treated in detail. However, note that the server S may be replicated and that various wireless functions may be performed either in the central stations C1–Cn or in the server S, depending on specific system architecture and design criteria.

As indicated, the central stations C1–Cn are coupled through the server S to the public switched network N. Of course, the public switched telephone network N also is coupled to a multitude of telephone terminals as generally represented by terminals S1 through Sn. As known in the art, any of a wide variety of couplings may be utilized to selectively accomplish the connective functions from the disclosed system herein, through a wireless network and the public network N to the terminals S1–Sn.

In a preliminary manner, consider a routine operation of the system (FIG. 3) by assuming that a user, e. g. the owner of the wireless telephone instrument TI1, is located in an area served by the central station C1 and wishes to communicate with someone at the telephone station S1, identified by the telephone number 1 213 555 6666.

The user simply withdraws the antenna 14 (FIG. 2) to energize the telephone instrument TI1. As a result, the lamp 22 is illuminated and certain identification signals are transmitted from the instrument TI1 (FIG. 3) to the central station C1. Note that other central stations, as the station Cn, may become involved if the user of the instrument TI1 roams.

After some preliminary processing, as described in detail below, the central station C1 transmits an audio cuing signal to the instrument TI1. As a result, the user hears the earphone 20 provide a vocal instruction or cue for authentication data, e. g. "Please speak the numbers of your instrument code".

In response, the user vocalizes the digits of the code associated with the instrument TI1 (usually treated as secret) e. g. "two, one, three, nine".

Next the user is given pre-paid value information and cued for a called number, e. g. "You now have sixty eight dollars credit. Please speak the digits of the number you are calling".

Responsively, the user speaks the called number digits, e. g. "one, two, one, three, five, five, five, six, six, six, six", designating the terminal S1.

Typically, the user then hears a ringing signal, presumably a wireless connection is established and communication proceeds in the conventional manner. The communication is monitored to reflect time and charges.

The detailed operation and processes of the composite system are treated below; however, as certain aspects of mobile telecommunication are presently well known they are not explained in detail. For example, various identification methods, broadcast techniques and structures, authentication techniques, calling processes, cellular organizations and mobility managements are well known. Detailed descriptions of such aspects of mobile telecommunications are provided in a book entitled, Mobile Telecommunications Networking, by Michael D. Gallagher and Randal A. Snyder, McGraw Hill, 1997, ISBN 0-07-063314-2, incorporated by reference herein. Particularly, the book treats techniques for interfacing a plurality mobile stations or instruments through base stations with the public switched telephone network. Generally as disclosed in the present system, the central stations C1–Cn can be related as base stations to function with the server S which as stated above may embody various wireless network structures. Regarding another facet of mobile telecommunication, specifically fraud prevention, some aspects of the problem are facilitated by the system hereof. However, various security techniques are well known which may well be applicable to systems in accordance herewith. For example, U.S. Pat. No. 5,541,977 issued Jul. 30, 1996 to Hodges et al treats a system for the avoidance of wireless fraud. As another example, U.S. Pat. No. 5,450,479 issued Sep. 12, 1995 treats improved security for prepaid systems using telephone calling cards.

To consider the system of FIG. 3 further, the detailed telephone instrument TI1 (represented as a dashed-line block) shows representations of the earphone 20, the microphone 28, the antenna 14, the switch device 30 and the power supply or battery pack 38, all as generally described above. Furthermore, the power supply 38 is connected to a control unit 56 through the switch device 30. Otherwise, the electrical elements are connected directly to a transceiver 54. In that regard, the control unit 56 and the transceiver 54 are interconnected by a cable 58. Generally, the control unit 56 and the transceiver 54 (along with other elements described below) are contained in the electronics package 40 (FIG. 2). The transceiver 54 (FIG. 3) may take a form somewhat similar to units well known in contemporary wireless telephone systems. Functionally in the embodiment of FIG. 3, both digital and audio signals (in one form or another) are transmitted by the transceiver 54; however, only audio signals are received as input.

The control unit 56 includes a memory 55 (ROM) primarily for storing identification data for the instrument along with control data for the control unit 56. Generally, the functions of the control unit 56 (treated below) are simple, involving the transmission of identification signals and sequencing the transmission and receipt of voice (audio) signals.

As indicated above, the wireless telephone instruments TI1–TIn may utilize currently well-known wireless techniques for communication with the central units C1–Cn. Communication is represented in FIG. 3 by wavy lines L1, L2 and Ln respectively. Such communication is from the antennas 14 of the instruments TI1–TIn through a central station antenna 60 to a wireless telephone platform 62. As suggested, the platform 62 incorporates substantial radio facility and is capable of accommodating broadcast communication with multiple calls simultaneously from the multiple instruments TI1–TIn.

The platform 62 may take the form of various structures as currently embodied in mobile base stations and is coupled to a control unit 64. Functionally, the control unit 64 sequences the operation of components in the central station C1, as disclosed below, basically to accomplish: screening wireless interfaces, informing and cuing callers, and to some extent, accomplishing the desired telephonic wireless connections and monitoring calls.

With approval, a call from the instrument TI1 is dialed up through the server S and the network N then bridged from the calling instrument TI1 to the terminal S1. As indicated, completed calls then are monitored to reflect service charges in the individual pre-paid balances of the wireless telephone instruments TI1–TIn which are kept at the central station C1.

To accomplish the approval and routing functions of the central wireless station C1, the control unit 64 is coupled to: a voice generator 66 (ARU), a voice recognition unit 68, a memory 70, operator terminal stations 72 (collectively represented) and finally, a network switching unit 74 connected through the server S to the public switched telephone network N.

Some components of the central station C1 are well known. Specifically, voice generators are well known as in the form of Automatic Response Units (ARUs) which may include some additional capability and are widely used to cue callers in telephonic interface systems. The voice generator 66 is controlled by the control unit 64 as disclosed in detail below.

Voice recognition units, as the unit 68, also are well known and have been developed to a attain a good level of reliably in identifying the spoken digits "zero" through "nine" in an audio form, even when communicated by telephone. For example, verbal or voice recognition units providing an alternative to dual-tone multi-frequency (DTMF) signals are described in U.S. Pat. No. 5,509,060 issued Apr. 16, 1996 to Hall et al.

In the present system, callers essentially are cued by the voice generator 66 to speak numbers digit-by-digit as explained above. Such spoken numbers are individually recognized at the central station C1 by the voice recognition unit 68 and provided in a digital form for use as data or control signals.

The memory 70, in the central wireless station C1, involves a substantial capacity and includes individual instrument cells 70A1–n (represented collectively) which are assigned respectively to the instruments TI1–TIn. For example, the cell 70A1 is allocated to the instrument TI1 and the cell 70An is allocated to the instrument TIn. Generally, an exemplary detailed format for the cells 70A1–70An is described below with reference to FIG. 5.

The memory 70 also includes a section 70B, which serves to indicate current connections of the instruments TI1–TIn, as for tracing on-line calls. Specifically, calls currently in process are stored to identify the individual wireless telephone instruments that are "connected," for example, to terminals S1–Sn. Addressing the memory section 70B is on the basis of the telephone numbers of called terminals S1–Snn. This feature is treated in further detail below.

At this point it is to be generally understood that the memory 70 functions with the control unit 64 to: cue callers, store and implement approval or test criteria, maintain records of use history and values, and store messages, all to implement dial-up communication.

In some instances, a need may arise for direct personal communication between an individual at the station C1 and the user of a wireless instrument TI. For example, it may be desired to accommodate a user who has entered unresponsive information or has an urgent need for personal assistance. Alternatively, it may be desirable to confront a questionable user of an instrument with person-to-person communication. In some situations, as an emergency, an instrument user may be willing to incur a meaningful charge to speak directly with a live operator. To accommodate such operations, under certain circumstances, a user may be transferred to a live operator at one of the terminals 72. As well known, the terminals include a display screen for advising the operator of an instant situation to the extent of stored data.

The network switching unit 74 is a dial-up apparatus for operation with the server S to interface the network N. Accordingly, calls are placed or routed through the network N to a select one of the terminals S1 through Sn. The unit 74 operates with the control unit 64 to bridge calls, and forms thereof are well known.

In view of the above descriptions, to further an understanding of the developed composite wireless system of FIG. 3, and the related operating processes, an assumed operating sequence will now be explained with reference to the various figures including the flow diagram of FIG. 4. Accordingly, assume a proper user, holding the wireless telephone instrument TI1 (FIGS. 1, 2 and 3) with a desire to establish telephonic communication with a telephone terminal S1 (FIG. 3).

At the outset, the assumed user withdraws the antenna 14 (FIG. 2) actuating the switch device 30 (FIG. 3) to energize the instrument TI1. The operation is indicated in FIG. 4 by an oval block 90 (upper left), designated "ON". Upon energization, the control unit 56 (FIG. 3, left) fetches the instrument's identification data from the memory 55 then actuates the transceiver 54 to broadcast signals representative of the instrument identification number, as indicated by the block 92 (FIG. 4). Note that in order to indicate the location of each operational step, as between the instrument TI1 and the central station C1, the blocks symbols in FIG. 4 are designated parenthetically either by a "T" (telephone instrument) or a "C" (central station C1).

The broadcast identification data from the instrument TI1 is received by the wireless platform 62 (FIG. 3, center) through the antenna 60 at the central wireless station C1 and passed to the control unit 64. The operation is represented in FIG. 4 by a block 94.

Upon receiving the identification data for the instrument TI1, the control unit 64 (FIG. 3) addresses a data cell 70A1 in the memory 70 serving the instrument TI1. The step is indicated by the block 96 (FIG. 4). Consequently, the data of the cell 70A1 is readily available.

As indicated above, details of the format for the exemplary cell 70A1 are treated below with reference to FIG. 5. However, for the present, it is important simply to understand that the control unit 64 fetches reference information or data from the memory 70, i. e. memory cell 70A1, to authenticate or verify that the instrument TI1 is proper as identified.

Various authentications or verifications may be involved, as discussed in greater detail below. However, at present, assume that the identification data coincides to reference data to authenticate the instrument TI1 as an instrument that is properly available for present use. Accordingly, a "yes" results from the query step as illustrated in FIG. 4 by a query block 98.

Note that a failure to verify the identification data for the telephone instrument TI1 (indicated by a "no" path from the query block 98) routes the operation to an "abort" block 102. It is to be recognized that several situations may result in an "abort" instruction. Of course, such occurrences may be handled differently and by various techniques. For example, a user simply may be informed that the instrument is not currently usable. Alternatives include tone signals, detailed explanations by the voice generator 66, and transfer to one of the terminals 72 for an operator interface.

Returning to the operative sequence, with verification of the instrument TI1 for use, the "yes" path from the query block 98 (FIG. 4) progresses to a block 100 indicating an operation by the control unit 64 (FIG. 3) to actuate the voice generator 66. Specifically, the user is prompted to speak the instrument code. For example, the voice generator 66 may be controlled to produce an audio message: "Please say your instrument code, slowly and digit by digit."

The audio message is broadcast by the wireless platform 62 to the transceiver 54 to actuate the earphone 20 with the cue. Responding to the cue, the user speaks the instrument code, e. g. "one, two, three, nine." See block 104, FIG. 4.

Figure 4:
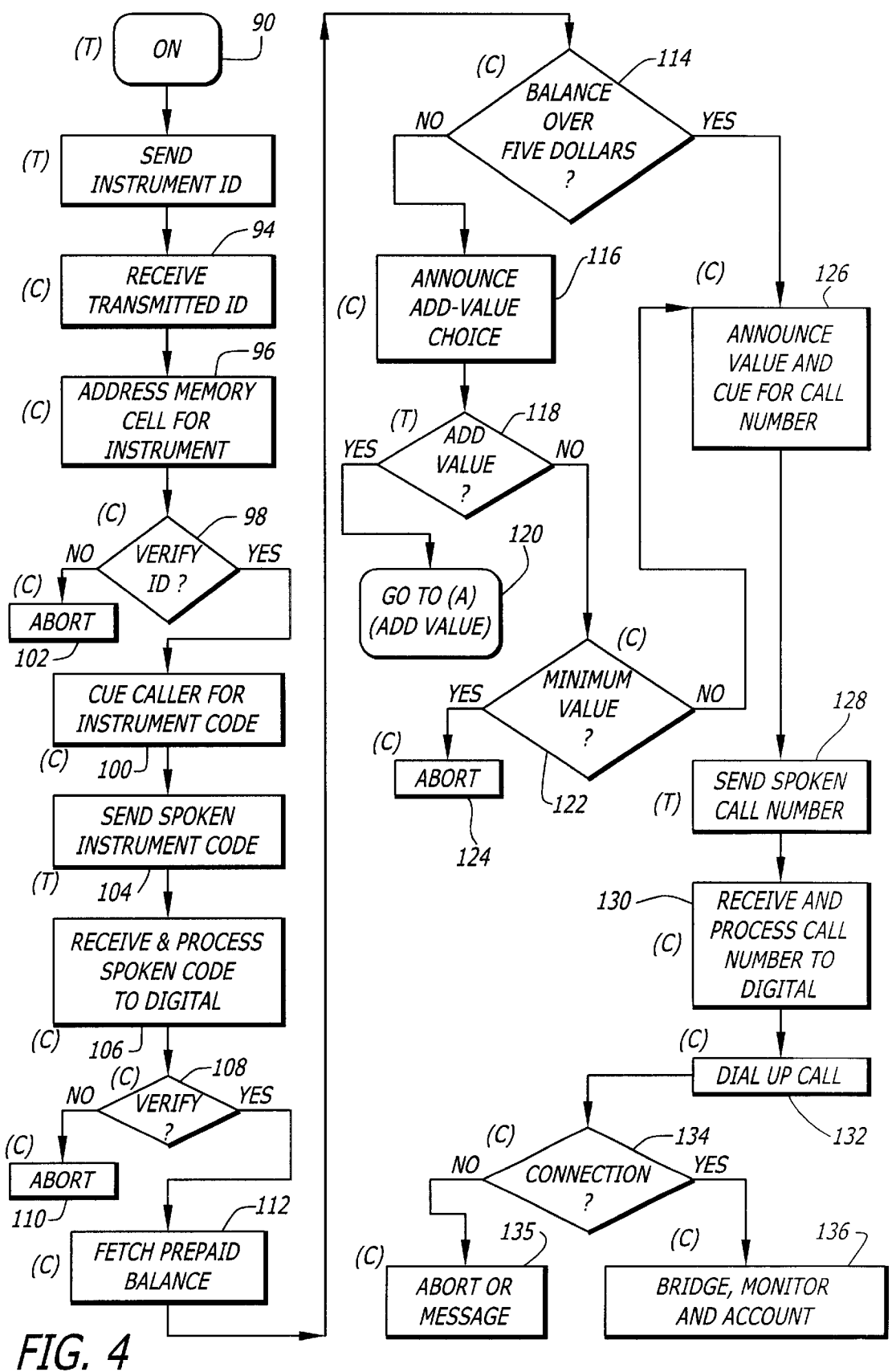
FIG. 4 is a flow chart detailing the operations of the system as depicted in FIG. 3.

The spoken numbers are converted to audio signals by the microphone 28 (FIG. 3) and transmitted by the transceiver 54 to the wireless platform 62, see block 106, FIG. 4.

Receiving the instrument code "1239", it is verified by the control unit 64, as by comparison with a reference code stored in the instrument cell 70A1. Generally, the operation is similar to that of verifying the instrument identification, (explained above) as well as the widespread operation of testing a users personal identification number (PIN) which is variously executed in many forms of processors. However, note that the instrument code is associated with the instrument TI1, rather than with any person as in the case of a conventional PIN. PIN verification also could be utilized.

As suggested, other verifications may be involved as considered in detail below. In any event, the verification operation, performed by the control unit 64 (FIG. 3) is illustrated by a query block 108 (FIG. 4) and results in either a "yes" or a "no".

If the instrument code is not verified as proper, an abort operation results (block 110, FIG. 4). Alternatively, verification ("yes") advances the operation to a block 112 to initiate another testing step in the process. Specifically the control unit 64 (FIG. 3) determines whether the wireless telephone instrument TI1 has a critically-low pre-paid balance. To perform the step, the control unit 64 again addresses the memory cell 70A1 for the instrument TI1 to obtain the current pre-paid credit or value held for the instrument. If the balance is critically low, the user may wish to add value, as by using a credit card.

The query block 114 (FIG. 4) tests the current pre-paid balance that is available for calls, e. g. "balance over five dollars?". Note that although values are treated in terms of dollars herein, such values are merely exemplary, recognizing that points, credits, and so on could be used to designate value.

In any event, the control unit 64 tests the current value against a critical minimum value to determine whether or not to inquire if the user wishes to increase the pre-paid value of the instrument. If so (yes) as illustrated by block 116, the user might be cued: "Your instrument now has a value balance of only four dollars and fifty cents, if you would like to increase the value by using a credit card, please say one".

The query is resolved by the user's command, a illustrated by a query block 118. If the user wishes to increase the prepaid balance, the process advances to a sub-process as indicated by an oval block 120 go to A (detailed below with reference to FIG. 4A). Otherwise, the process moves to another query block 122 representing another "test" step executed by the control unit 64 (FIG. 3). Specifically, the query is whether the instrument TI1 has sufficient current calling value to permit any call. If not, an abort is commanded as indicated by an abort block 124.

If the instrument has sufficient value i.e. an amount in excess of some minimum call value, the process moves to the step of block 126, which also indicates the step that follows a positive result from the test block 114 (balance over five dollars?). With the process advanced to the stage of proceeding with a call, the block 126 indicates cuing the user for the called number ("1 213 555 6666" for terminal S1). Additionally, the user is given the current pre-paid value for the instrument.

Specifically at this stage, the control unit 64 controls the voice generator 66 to cue the user. For example, the audio message transmitted to the user might take the form: "The present value of your instrument is sixty four dollars and fifty cents, please speak the number you are calling digit by digit."

At the instrument TI1, the user speaks the desired number to be called, e. g. "one, two, one, three, five, five, five, six, six, six, six." The spoken words impact the microphone 28 (FIG. 3) and are converted to audio signals that are broadcast in one form or another by the transceiver 54 using the antenna 14. See FIG. 4, block 128.

The transmitted audio signals representative of the called number are received (FIG. 4, block 130) at the wireless central station C (FIG. 3) by the platform 62. Applied to the control unit 64, the signals are converted to a digital (dial up) form then applied to the network switching unit 74 to accomplish a dial-up operation through the server S and the public switched telephone network N.

Using the multitude of capabilities and structures of the public switched telephone network N, a connection is sought with the terminal S1, see block 132, FIG. 4. Normally, the connection would be established and bridged such that the user would hear a "ringing" tone. It may be the policy that the call would be charged only if communication is established. Accordingly, a query block 134, is illustrated. If the connection is not established, which might be determined by the user inactivating the instrument TI1, operation is aborted (block 135) with no action necessary.

Alternatively, if a connection is established (block 136, yes), the bridge between the instrument TI1 (FIG. 3) and the terminal S1 is held with monitoring to determine charges for the call as indicated by the block 136. Essentially, when the communication is terminated, the time and charges for the call are reflected in the prepaid balance as stored in the memory cell 70A1 for the instrument TI1. These operations are executed between the control unit 64 and the memory 70.

In summary, to this point FIG. 4 illustratively describes the process that is cooperatively executed by the control unit 56 in the wireless telephone instrument TI1 and the control unit 64 (in the central station C1). In a further embodiment, an instrument TN (FIGS. 6 and 7) functions cooperatively with the control unit 64 (FIG. 3) to selectively accomplish both voice and number (numeric) communication.

Of course, the audio signals representing speech from the individual instruments as TI1 and TN (described below) might take various forms, for example as mentioned above, they might be analog or digitized. However, in accordance herewith, a distinction is made between number audio signals that serve to express numbers, and voice audio signals that are to be vocalized. Ultimately, in one form or another, the number signals may function for example: to route calls, to provide control functions or to communicate information. On the contrary, voice audio signals manifest speech and serve to accommodate vocal conversation.

As explained with respect to the above embodiment, the interpretative selection for either number signals or voice signals is determined by the stage of operation. For example, during the call up stage, audio signals representative of numbers that are spoken by the user are interpreted as number signals to route a call. However, to the present extent of description, after a connection is established, during the conversational phase, all audio signals representing words spoken by the user (including numbers) are treated as voice signals to produce speech.

In the embodiment of the instrument TN, as described below, flexibility is provided to accommodate selective treatment of audio signals that are representative of numbers spoken by a user, as either number signals or voice signals. Accordingly, during the conversational phase, a user is able to enter information numerically, as to a computer, for example in response to a prompt: "Please enter your Social Security number." Stated another way, during the conversational phase, voice-activated telephone instruments can selectively accommodate either vocal communication (as with an another person) or numerical communication (as with a computer in a computer telephonic interface). It is noteworthy that the microphone system may take the form of a structure to variously format audio signals. In a somewhat related context it also is to be noted that the instrument may record the current prepaid balance and accordingly control operation, either by interfacing the user as described above or by simply halting operation when consumed.

Figure 6:
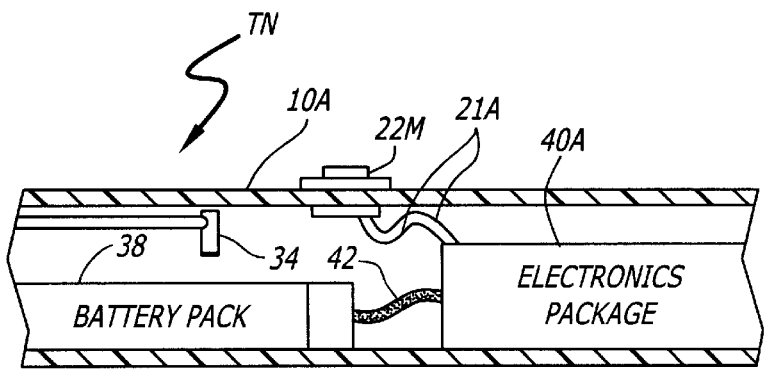
FIG. 6 is a sectional view of an alternative embodiment of a wireless mobile telephone instrument in accordance herewith.

Referring to FIG. 6, a central fragment illustrates the telephone instrument TN as an alternative embodiment of the instrument TI shown in FIG. 1. Specifically, the distinct central portion of the telephone instrument TN is shown in cross section, illustrating a switch 22M affixed in the cylindrical housing 10A. The switch 22M may take various forms; however, in the present embodiment, a simple single-pole, momentary-contact, push-button switch is mounted and connected to the electronics package 40A by conductors 21A.

In operation, once communication is established with a remote terminal, activating the switch 22M commands the telephone instrument TN to connect and transmit numerical signals rather than voice signals. For example, as disclosed in detail below, a user of the instrument TN may be in a CTI (computer telephone interface) during which it is desired to transmit both voice signals and number signals. Again, the signals may take a variety of forms; however, the selection depends on the form of information to be transmitted, voice or number. As a specific example, at one point, the user may be prompted to speak an address. Accordingly, voice signals (analog, digital, etc.) would provide the communication. At another stage, the user may be prompted to enter a Social Security number. At that stage, the user simply actuates the numbers switch 22M, then speaks the digits of the Social Security number resulting in the transmission of number signals to the interface computer, e.g. station C1. Of course, the number signals may take various forms; however, one form may comprise dual tone multiple frequency (DTMF) signals. The detailed structure of the electronics package 40A in the instrument TN will now be considered with reference to FIG. 7.

Figure 7:
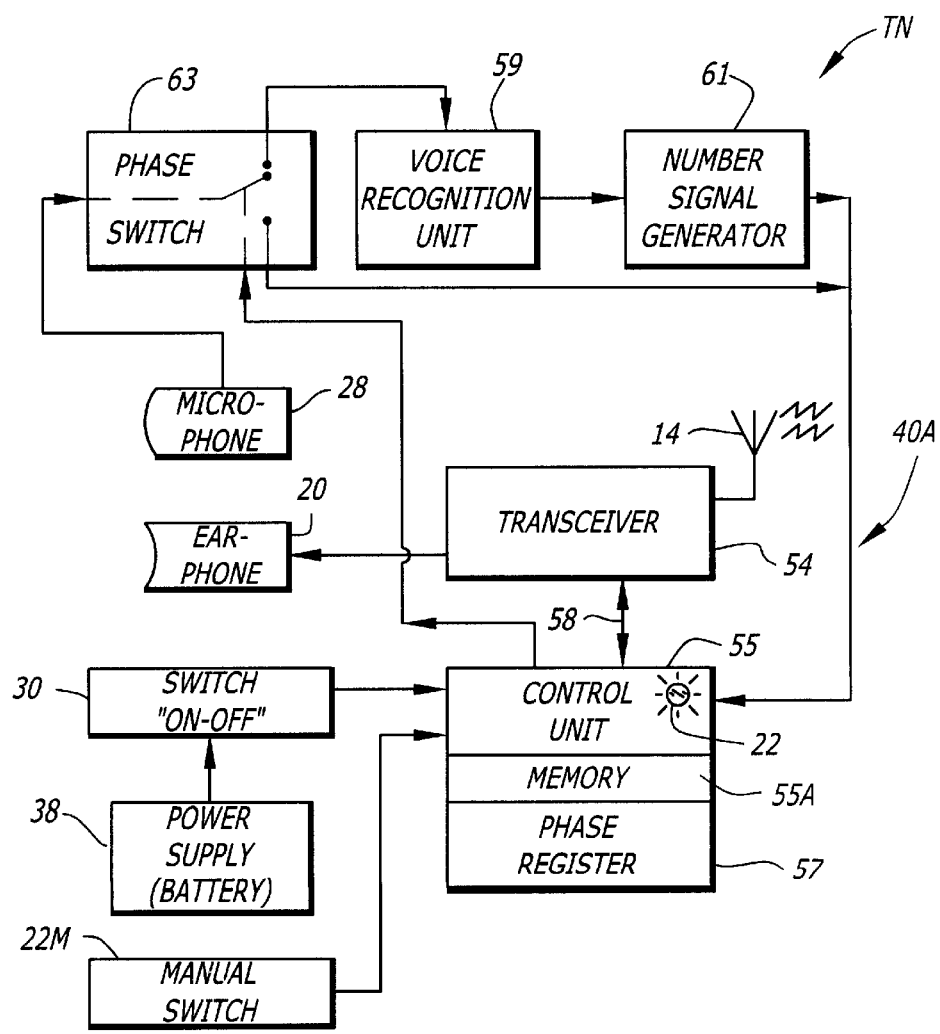
FIG. 7 is a block diagram of the alternative embodiment of FIG. 6 showing instrument components.

Several components in the electronics package of FIG. 7 are similar to components previously described with respect to the electronics package 40 (FIG. 2). Generally, such common components perform similar functions and carry similar reference numerals. However, in the embodiment of FIG. 7, the control unit 55 is substantially expanded to include several additional elements. The manual switch 22M (FIG. 6) is illustrated in FIG. 7 as a block 22M connected to the control unit 55 which incorporates a memory 55A and a phase register or indicator 57.

The control unit 55 also is connected through a phase switch 63 to a vocal recognition unit 59 and a number signal generator 61. The vocal recognition unit 59 along with the number signal generator 61 function as a cooperating structure for converting voice signals to number signals. Specifically, voice signals from the microphone 28 may be applied through a control switch 63 to the unit 59 which identifies specific numbers to the generator 61 (as by digital signal) which in turn supplies representative number signals (e.g. DTMF) through the control unit 55 to the transceiver 54 for transmission from the antenna 14.

Note that the control switch 63 (indirectly controlled by the switch 22M) will normally be embodied in electronics; however, for purposes of illustration, it is symbolically represented somewhat electro-mechanically as a simple single-pole, double-throw switch actuated by the control unit 55 under control of the switch 22M. In the lowered position, the control switch 63 provides voice signals from the microphone 28 through the control unit 55 to the transceiver 54 whereby as part of the microphone system, such signals may be variously treated and processed, then transmitted as voice signals from the antenna 14.

When the control switch 63 is in a raised position (as illustrated) under control of the control unit 55 and the switch 22M, voice signals representing spoken numbers are provided to the voice recognition unit 59 and the number signal generator 61 for conversion to number signals which are provided through the control unit 55 to the transceiver 54. Again, the number signals may be variously formulated for transmission from the antenna 14.

Of course, the voice signals may be in various formats, e.g. modulated analog, digital and so on. Similarly, the number signals also may take various forms, including DTMF or other dial-up signals. In any event, the wireless platform 62 is able to accommodate signals in the provided forms as for passage to a remote station.

The operation of the instrument embodiment of FIG. 6 has many similarities to the embodiment of FIG. 2. In that regard, the electronics package 40 of the embodiment of FIG. 2 is described above with reference to FIG. 4. FIG. 4 also is descriptive of many operations that may be accomplished by the electronics package 40A in the instrument embodiment of FIG. 6. However, the operation affected by the electronics package 40A (FIG. 6) is expanded into several phases to control the signal mode manually and to embrace a preliminary interface with the user to accomplish storage of calling information in the instrument 40A for transmission in bulk to the central station, e.g. station C1.

Functionally, the phases of the instrument 40A depend on the operating stage and operations desired by the user. Generally, the phases include: "off", "stand by", "calling", "conversation", and "numbers." The phase progressions are set forth in a chart below; however, consider a few preliminary comments. Of course, the "off" phase simply designates that the instrument is completely inactive. The "stand by" phase sets the instrument to receive incoming calls. The "calling" phase is entered during the placement of an outgoing call and is terminated with a connection to a remote terminal.

Upon termination of the "calling" phase, the "conversation" phase is initiated during which the user speaks for vocal communication. Termination of the "conversation" phase is accomplished to enter the "numbers" phase by depressing the manual switch 22M (FIGS. 6 and 7). In accordance with the disclosed embodiment, the "numbers" phase continues until the user releases the switch 22A, after which the system returns to the "conversation" phase.

As indicated above, the various phase progressions are summarized in the following chart.

PHASE PROGRESSIONS

| Initiating Action | Phase (Register 57) | Function | Operation |
|---|---|---|---|
| Ant. Switch "OFF" | "OFF" | None | None |
| Ant. Switch "ON" + Double Click Man. Switch | "Standby" | Awaiting Call | Standby |
| Ant. Switch "ON" | "Calling" | Outgoing Call | Convert Spoken Numbers to Dial-Up Numbers |
| "Calling" Phase + Send Call Number | "Conversation" | Vocal Communication | Transmit Audio |
| "Conversation" Phase + Man. Switch "ON" | "Numbers" | Number Communication | Convert Spoken Numbers to Dial-Up Numbers - Transmit |
| "Numbers" Phase + Man. Switch "OFF" | "Conversation" | Vocal Communication | Transmit Voice |
| "Standby" Phase + In-Call + Double Click Man. Switch | "Conversation" | Vocal Communication | Transmit Voice |

Figure 4A:
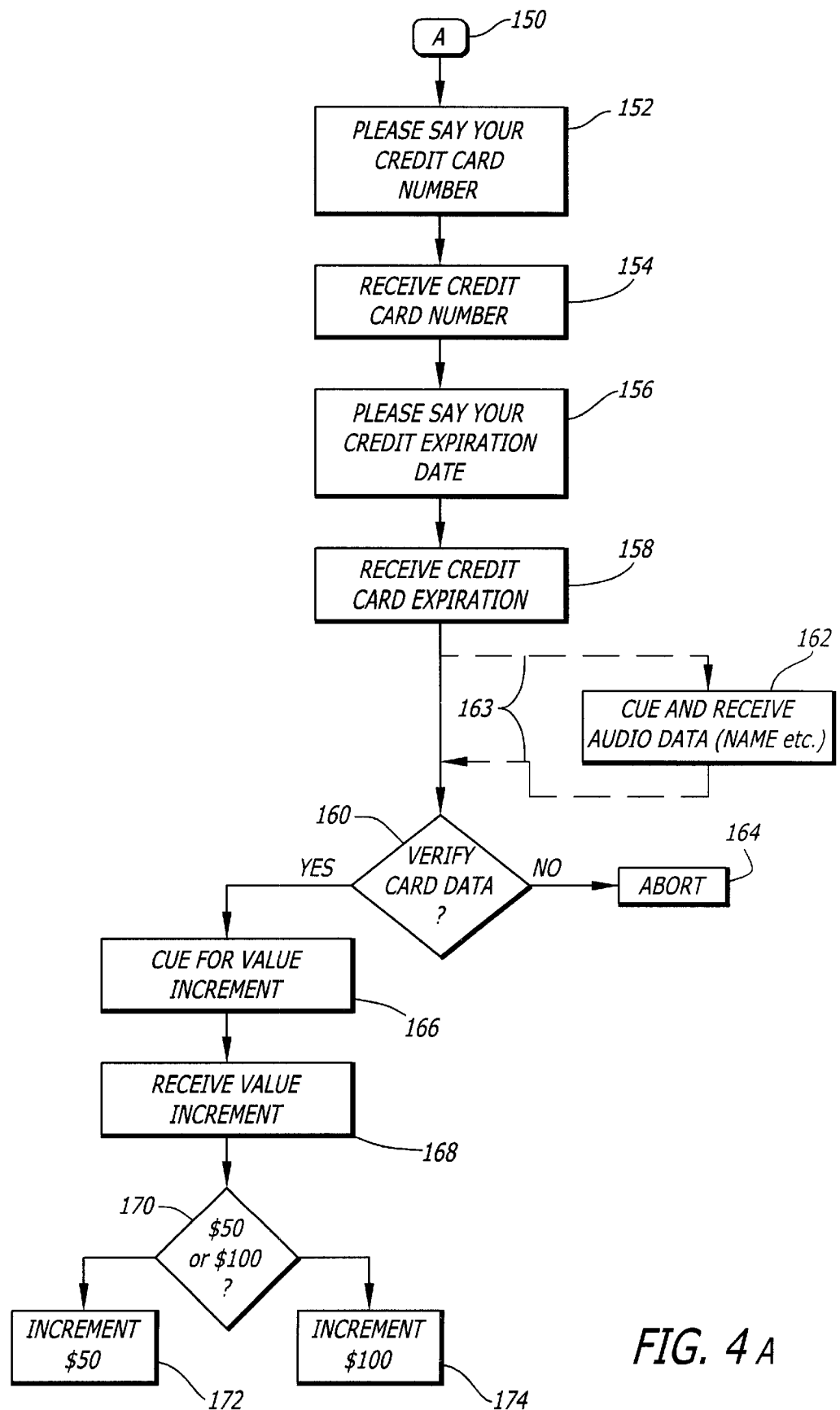
FIG. 4A is an extension of the flow chart of FIG. 4.
Figure 8:
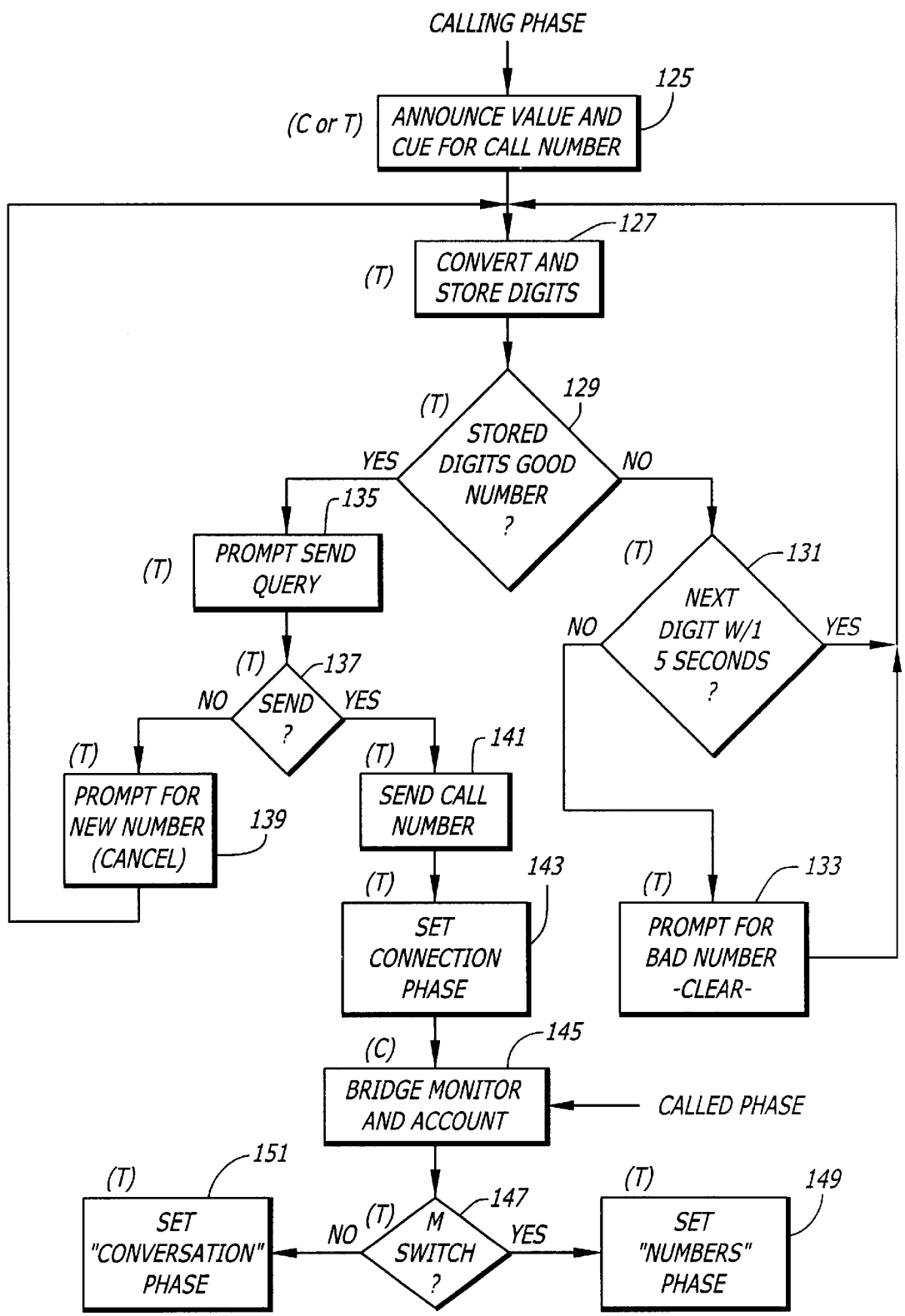
FIG. 8 is a flow chart detailing the operation of the instrument of FIG. 6.

As indicated above, the control unit 56 is defined to some extent by the process illustrated in FIGS. 4 and 4A. However, departures may be introduced at blocks 98 or 114 to include steps as illustrated in FIG. 8. Specifically, a positive result from either of the blocks would move the program to block 125 which indicates the step of prompting a user to speak the called number. To respond, the user speaks the called number, digit by digit into the microphone 28 (FIG. 7). Consequently, during the "calling" phase, the representative audio signals pass through the phase switch 63, the VRU 59 and the number signal generator 61 to the control unit 55 for storage in the memory 55A as number signals. The operational step is illustrated in FIG. 8 by the block 127. As each digit is stored, the control unit 55 checks to determine the completion of a good or complete called telephone number. The step is represented in FIG. 8 by a query block 129. If a valid called number is not completed, the process advances to a step represented by a query block 131 to test a waiting period. If another digit is not received within a predetermined interval, the process advances to the step of block 133 indicating an invalid telephone number. Functionally, the situation may occur when the user has not "dialed" a complete called number and does not enter another digit for a predetermined interval of time, e.g. 5 seconds. The failure to enter a digit within a predetermined interval indicates the caller should be informed that a valid number has not been entered, thereby returning to the initial step represented by block 127 of cuing the user to freshly enter a called number. Similarly the caller is so informed upon entering digits of a complete but invalid number.

If the user enters another needed digit within the predetermined time, the operation involves converting and storing such a digit as indicated by the block 127 and testing for completion of a valid calling number as indicated by the query block 129. With the completion of a valid called number (query block 129), the next step is simply to query the user if the number is to be "dialed." Such a prompt is indicated by the block 135.

In the event that an incorrect number has been stored, or in some other possible circumstances, the user may wish to cancel the "dial" operation. In that regard, note that the prompting step represented by the block 135 may include vocalizing the stored telephone number to be called.

If the user elects not to "dial" i.e. transmit the stored number to the wireless platform 60 (FIG. 3) a "no" path is followed from the query block 137. As a consequence, the user is prompted to enter a new number and the stored number is canceled. The operation, as indicated by the block 139, may. also prompt the user with the possibility of terminating communication, i.e. "going off hook" or "hanging up". From the step of block 139, prompting the caller for a new number, the process returns to the operation of block 127, i.e. converting and storing received digits. Alternatively, the user may turn off the antenna switch 30 (FIG. 3) and proceed to the "off" phase.

Returning to the query block 137, approval of the stored number to be sent or "dialed" results in the operational step of block 141, i.e. transmitting the stored number to accomplish a telephone connection. In that regard, the user may hear traditional sounds pending a connection.

With the transmission of the stored number, the control unit 55 (FIG. 7) advances the phase counter 57 to the "conversation" phase as indicated by the above chart. The operational step is indicated by the block 143. Thus, the user is bridged through the public switch telephone network N (FIG. 3).

With the establishment of a telephonic connection, the communication may simply proceed (person-to-person) in a vocal mode with the instrument TN in a "conversation" phase. Alternatively, the instrument TN may be interfaced with a computer. In the course of such an interface, the user likely will be prompted to enter numbers, e.g. "Please enter your Social if Security number." To accomplish such an operation, the user first depresses the manual switch 22M moving to the "numbers" phase. The operation is illustrated in FIG. 8 by query block 147. With the actuation of the manual switch 22M, the control unit 55 sets the phase register to the "numbers" phase as indicated by the block 149 (FIG. 8). Then, when the user speaks the prompted numbers, e.g. a Social Security Number, the control unit 55 actuates the phase switch 63, passing the audio number signals through the voice recognition unit 59 and the number signal generator 61 to provide number signals through the control unit 55 and the transceiver 54 to the wireless platform 62 (FIG. 3).

Upon completion of the numerical entry, the user releases the manual switch 22M (FIGS. 6 and 7) returning the operation to the "conversation" phase for further vocal communication. The operation is illustrated in FIG. 8 by the block 151. With the "conversation" phase restored, the control unit actuates the phase switch 63 to provide signals from the microphone 28 to the control unit 55 for direct passage through the transceiver 54 for transmission as voice.

In view of the above explanation, it will be apparent that the instrument TN is capable of operating in a plurality of phases, as indicated by the above chart. It is noteworthy that the "standby" phase exists during which incoming calls may be received. To accomplish a "standby" phase, the antenna switch 30 is set to "on" and the manual switch 22M is double clicked. The operation is illustrated in the above chart to initiate the "standby" state in which calls may be received by the instrument TN. Note that an incoming call may be variously indicated, as by a signal from the earphone 20 (FIG. 7) and with acceptance by a double click of the manual switch 22M. Such operation again initiates the "conversation" phase.

Some further sub-processes or process steps that may be incorporated in systems hereof will next be considered. For example, the sub-process of adding value was mentioned above. Also, the systems may incorporate a message capability somewhat akin to contemporary pager operation. Emergency access to a live operator also was mentioned above and is treated at a later point below. Additional aspects of fraud control also are treated below.

In the above descriptions relating to FIG. 4, a point (A) was reached (designated by the oval block 120) in the "numbers" phase, when a user indicated a desire to add value to the pre-paid balance. Essentially, the operation is to add value to the prepaid balance of a telephone instrument, for example the instrument TI1, by incrementing the value stored in the memory cell 70A1 (FIG. 3). For example increments of either fifty or one hundred dollars might be selected.

The selected increment of value is reflected in the balance stored at the central station C1 (e.g. home station for the instrument TI1) or in individual instruments and may be supported by a conventional credit card. In that regard, to support the credit card transaction, data in the form of a credit card number and expiration date may be sufficient. However, it is common practice additionally to require the card holders name or other data. As disclosed below, such additional data may be communicated in the form of audio signals representing words spoken by the user. Essentially, the control unit 64 accommodates recording such audio information.

Considering the subprocess in detail, reference now will be to FIG. 4A showing an oval 150, designated A (top) from the block 120 (FIG. 4). The initial step (block 152) of the sub-process involves cuing the user to state the number of the credit card supplying the increment of value. As described above, the number is spoken digit-by digit to be received, in audio form, at the central station C1 (block 154). As described above, the resulting audio signals may be converted to digital number representations or signals for further processing.

In a similar fashion, the user is cued by the voice generator 66 to speak the card expiration date (block 156). Again, as described above, the date is spoken and received as audio signals then converted and processed as illustrated by a block 158.

The next step involves a query, as indicated by the block 160, unless the process encompasses taking alphabetic or voice data, e. g. the user's "name", "address" and so on. In that event, a block 162, indicated as an alternative step by a dashed-line path 163, involves cuing, receiving and distinctly recording or processing such data, again in the form of audio signals. Such signals are treated differently. Rather than to be converted to digital or number representations, the audio analog signals representative of alphabetic words may be stored for processing which may involve subsequent consideration by a person.

In any event, the process next advances to the query block 160 mentioned above and indicating a test executed by the control unit 64 (FIG. 3) to verify the received data. If the data is only digital numbers, verification typically would be on line. With verification, the transaction is approved. Otherwise, the process advances to the block 162 (FIG. 4Ad) indicating an abort of the communication.

Proceeding along the "yes" path from the query block 160, the next step is to cue the user for the value increment, e. g. "$50" or "$100"? The step is indicated by a block 166 and involves the user either speaking the digit "one" for a "$50" increment, or the digit "two" for an increment of "$100".

The spoken increment digit is received, as indicated by a block 168, converted to digital number signals and depending on the selected option is processed by recording the increment. As illustrated by a query block 170 and the alternative incrementing blocks 172 and 174 value is added to the prepaid balance. Thus, the final step is executed by the control unit 64 (FIG. 3) and the memory 70. Specifically, the memory cell 70A1 stores the prepaid value of the instrument TI1, which is thus incremented by the selected increment amount. Note that as indicated above, the memory function described above regarding the exemplary memory cell 70A1 may be performed by the memory 55A (FIG. 7) of individual instruments TN. In any event, further detail will now be provided in relation to memory.

Generally, reference has been made to the memory cells 70A1–n (FIG. 3, collectively represented) which are associated respectively with the individual instruments TI1–TIn. In that regard, depending on system design, regulatory provisions and operating formats, the content and location of the memory 70A may vary to a considerable extent. However, an exemplary format for the memory cell 70A1 is treated below and may typify each of the cells.

As indicated above, in the disclosed embodiment, each wireless telephone instrument TI1–TIn has identification data stored in the memory 70, including an identification number, for example, "2746832814" for the instrument TI1. A detailed treatment of identification numbers for mobile instruments or stations is provided in the above-referenced book, Mobile Telecommunications Networking, specifically in a section beginning on page 64.

Recognizing that instruments in accordance herewith may be constructed and treated somewhat differently, it is to be recognized that the indicated number is merely illustrative and conventions, regulations and so on may command identification numbers or data in totally different forms with considerations as set forth in the referenced book. Also, memory from the cell 70A1 may be in the instruments.

Returning to the operations herein, the identification number is transmitted (broadcast) from an instrument (e.g. TI or TN) on its activation as identification data. On receipt, the number is used by the control unit 64 to address the memory 70 (FIG. 3) and accordingly locate a specific memory cell, e. g. cell 70A1 for the instrument TI1. Thus, the memory cells are addressed individually by the identification numbers as illustratively represented by an arrow 191 in FIG. 5 (upper left).

The exemplary cell 70A1 includes a number of individual fields horizontally arranged and shown separately in FIG. 5. At the top of the cell 70A1, as shown, a field 193 stores the identification number ("2746832814") for confirming addressing operations.

Next in order, a field 194 registers the instrument code, specifically a four digit number, e. g. 2139. The field 194 provides a reference for verification of the received instrument code that is tied to the instrument TI1 and may be provided by the user during each use to verify that the user is proper. A pair of related fields 195 and 196 respectively store the current and last prior prepaid values of the instrument TI. The current value, e. g. $68.50 is used for authorizing use and is reported to the user. The prior value is accessible to an operator, along with all fields of the cell for reference purposes, as at one of the operator terminals 72 (FIG. 3).

A series of similar fields 198 (FIG. 5) are collectively identified and store a record of the calls made by the instrument TI1. The fields 198 may be organized as a transient memory for some predetermined number of calls that were made most recently. For example, only the last twenty calls might be stored. Designation or target telephone numbers are illustrated for the three last calls made from the instrument TI1. Dates also may be recorded.

Another series of similar fields 200 also are collectively represented and provide a record of refreshed value increments. Specifically, incremental values and dates for adding value to the prepaid balance are stored as shown. Again, the storage may be transient covering some predetermined number of occasions.

As previously suggested, the system can receive and report messages via the instrument TI1. In that regard, messages are delivered only at a time when a telephone instrument TI is activated. Messages, in the form a telephone calling number and a date, are stored in a group of memory fields collectively designated as fields 202.

If message operation is provided, the process of FIG. 4 is modified to allow for delivery. Specifically, after the code verification step (FIG. 4, block 108) the user simply is advised that a message has been left and is given the calling number and date vocally. Once delivered, the messages in the fields 202 may be purged.

Another ancillary aspect of the disclosed system involves limitations that may be imposed individually on the use of each instrument, e.g. the instrument TI1. Some examples will explain the structure and operation.

One expected widespread use of instruments in accordance herewith is by young students as in elementary school. With the defined risk of loss and the convenient physical form of instruments hereof, parents may wish to provide instruments to their children both for security and communication. To further limit the risk of loss, in accordance herewith use limitations can be imposed on the instruments.

Pursuing the example of a young student as the user, it might be presumed that proper use of the instrument TI1 would be restricted to a single dialing area. Accordingly, the use of the instrument can be so limited by storing the area code or codes that are approved for calls. Such limitations are stored in a group of fields 204 (FIG. 5) and are employed to indicate the approved use of the instrument. Note that the stored data may be in individual instruments with control implemented by the control unit 55.

To illustrate the limiting sub-process step, the flow diagram of FIG. 4, would be modified simply by incorporating a further verification step similar to that of the block 108. Thus a test or tests are performed by the control unit 64 (FIG. 3) or the control unit 55 (FIG. 7) as a part of the step represented by block 128 ("receive and process call number"). The test checks the called number against the reference area code numbers as stored in the fields 204 (FIG. 5).

Another limitation may be based on the time of day when calls can be made. For example, the day (twenty four hours) might be divided into four segments of six hours each called: "morning", "day", "evening" and "night". For example, the instrument TI1 may then be restricted for use to any one or more of the segments. For example, an employee given the instrument TI1 might be restricted to using it only during the segments designated "morning" and "day". The approved six-hour segments are stored in the fields 204 and are imposed by verification processing in the control unit 64 (FIG. 3). For example, such verification may be a part of the process step 106 (FIG. 4).

Generally, attempted use of such a telephone instrument TI1 that is outside the imposed limitations will be aborted in favor of a brief denial message. Thus, the risk of loss from clones is further reduced.

Returning to the memory cell 70A1 (FIG. 5) a group of fields 206 store various personal and statistical data on the assigned owner or user. Again, such information is displayed to an operator in the event of a transfer to one of the operator terminals 72 (FIG. 3). Often such data will be useful in communicating with users, as in the cases of interrupts or abort situations. Emergency data may be included, as for example, the home telephone number of a young person or that of a specific medical facility.

Another aspect of the present system involves emergency transfer to an operator at one of the terminals 72 (FIG. 3). As indicated above, the situation sometimes occurs when a user desperately wishes to speak directly with a person. To accommodate that situation, the present system accommodates a transfer command. In an exemplary operation, a user indicates the desire to communicate with a person by speaking a "transfer" code, e. g. "three", "three", "three" "three" - - - "three" and so on. The sequence is detected as the unique transfer code by the control unit 64 and the user is transferred to one of the operator terminals 72. A charge may be involved.

As mentioned above, the problem of cloning may be variously combated, however, another aspect hereof may be utilized in that regard. A counter, in the control unit 64 (FIG. 3), indicates a specific number for each call received on each line or port of the platform 60. For example, the counter might indicate any of the numbers: "one", "two" or "three" on each line for each incoming call. The received number selectively commands the control unit 64 to broadcast a burst signal of a predetermined frequency to the calling instrument. That is, three different frequencies are indicated by the three different counter numbers respectively.

Upon receiving the burst signal, the wireless telephone instrument replies with an associated number, e. g. a four digit number. The same associated number is stored as a reference by the memory 70, for example, in each of the unit cells 70A1–n identified with the calling instrument TI1.

The received and reference numbers are compared by the control unit 64 to condition calls. In the case of coincidence, the call proceeds, the operation being completely transparent to the user. Alternatively, if the response number does not coincide to the reference number, the call is denied. Accordingly, identification of the individual wireless telephone instruments TI is confirmed dynamically.

The additional verification operation involves a relatively minor addition to the instruments TI1–n in the form of filters to identify the frequency of each received burst signal and the capability to fetch the specified number from the read-only memory 55. In that regard, frequency decoding in telephonic systems is well known and described for example in a U.S. Pat. No. 4,320,256 to Freeman, and entitled Verbally Interactive Telephone Interrogation System With Selectible Variable Decision Tree.

In view of the detailed descriptions set out above, the structure and operation of the system to execute effective communication processes will be apparent. However, a few additional comments may be appropriate in relation to applications for the system. The case of a young student was considered above and is here emphasized in the interests of security and communication. Telephones are often unavailable when most needed and in the case of young people, the need may be extreme.

The same features that render an instrument in accordance here with suitable for a young person also are present for numerous other applications. Specifically, reduced risk of loss, minor complications of ownership and considerable convenience for storage render such instruments practical for travelers, automotive use, employee assignment, pager users, and a host of others.

To consider the procurement of an instrument, a purchaser might take delivery with only minimal formality. Essentially, the instrument would be given an identification number and an instrument code, both being stored in the memory 55 and a related one of the cells 70A1–n. A prepaid amount would be paid and recorded in the assigned cell. Basic owner data also may be required and stored in the group of fields 206 (FIG. 5); otherwise, complications are minimal. The owner is not obligated for unlimited calls. Credit information or standing is unnecessary. Billing details are avoided. The complications are relatively few. The convenience is relatively good and the risk of loss is relatively small.

In view of the above explanations of exemplary systems and processes, it will be apparent that other embodiments and processes may be employed utilizing the developments hereof. Accordingly, the appropriate scope hereof is deemed appropriately determined on the basis of the claims as set forth below.

What is claimed is:

1. A system for wireless telephonic communication between telephone terminals through a public switched telephone network, comprising:

a plurality of discardable, keyless, wireless telephone instruments including a transceiver, an instrument control unit, an earphone output and an input structure consisting of a microphone unit for converting voice sound to representative audio signals;

a central station that stores prepaid balances of the wireless telephone instruments;

a wireless platform located at the central station to communicate with the wireless telephone instruments;

a central control unit located at the central station;

a voice generator and a voice recognition unit controlled to sequence vocal prompts provided from the voice generator to the earphone output and number signals provided from the input structure of a discardable keyless, wireless telephone instrument to the voice recognition unit to accomplish a dial-up called number for one of the telephone terminals for use by a switched telephone network.

2. A system according to claim 1 wherein the voice generator and voice recognition unit are located in the instrument control unit.

3. A system according to claim 1 wherein the voice generator and voice recognition unit are located in the central control unit.

4. A wireless, keyless telephone instrument for prepaid and discardable use with an approving central station capable of bridging to a public switched telephone network for outgoing communication by the wireless telephone instrument with remote stations, said wireless telephone instrument consisting of:

a housing defining an interior space;

an earphone fixed to the housing to provide represented vocal sounds from audio signals;

a microphone structure fixed to the housing to provide representative audio signals from vocal sounds;

a wireless transceiver fixed to the housing and coupled to the earphone, and the microphone to communication with the central station and through the public switched telephone network to select remote stations;

a memory fixed to the housing, storing instrument data on the wireless telephone instrument;

an activation switch fixed to the housing; and a control unit fixed to the housing and coupled whereby, activation of the activation switch to place an outgoing call transfers instrument data on the wireless telephone instrument from the memory to the wireless transceiver for transmission to the central station, and then to receive prompting signals for the earphone to prompt for spoken numbers to the microphone for a select remote station to attain a connection through the public switched telephone network to the select remote station.

5. A wireless telephone instrument according to claim 4 wherein instrument data on the wireless telephone instrument includes an identification number he instrument.

6. A wireless telephone instrument according to claim 4 wherein the wireless transceiver includes an antenna and the activation switch is controlled by the position of the antenna.

7. A wireless telephone instrument according to claim 4 wherein the transceiver and the control unit are integrated as an electronics package powered battery pack.

8. A wireless telephone instrument according to claim 4 wherein the telephone instrument is configured as a writing instrument.

9. A process for wireless telephonic communication to accomplish an interface between wireless, keyless telephone instruments and a central station to establish communication with remote telephone terminals through a public switched telephone network, comprising the steps of:

providing a plurality of keyless and wireless, discardable instruments having prepaid usage values, capable of transmitting an identification signal, on activation, to the central station indicating a desire to communicate with a desired remote telephone terminal;

receiving the identification signal at the central station from an active keyless and wireless, discardable telephone instrument to test for a proper call;

upon a successful test for a proper call; actuating the wireless telephone instrument to prompt for spoken numbers indicating a telephone calling number for a desired remote telephone terminal;

transmitting signals representative of the spoken numbers from the active keyless and wireless, discardable telephone instrument to the central station;

applying the signals representative of the spoken numbers from the wireless telephone instrument as dial-up signal representations to the public switched telephone network to attain a connection with the desired remote telephone terminal; and bridging the wireless telephone instrument to the desired remote telephone terminal.

10. A process according to claim 9 wherein the test for a proper call includes testing the identification signal from the wireless telephone instrument.

11. A process according to claim 9 wherein the test for a proper call includes testing the identification signal from the wireless phone instrument to determine the adequacy of a prepaid balance.

12. A process according to claim 9 including a further step of transmitting prepaid balance signals to the wireless telephone instrument for announcing a prepaid balance.

13. A process according to claim 9 including a further step of monitoring a call bridging the wireless telephone instrument to a desired remote station and accounting for the call in the prepaid balance.

14. A process according to claim 10 including a further step of transmitting prepaid balance signals to the wireless telephone instrument for announcing a prepaid balance.

15. A wireless, keyless telephone instrument for prepaid and discardable use with an approving central station capable of bridging to a public switched telephone network for outgoing call communication by the wireless, keyless telephone instrument with remote stations, said wireless, keyless telephone instrument comprising:

a housing defining an interior space;

an earphone fixed to the housing to provide represented vocal sounds from audio signals;

a microphone structure fixed to the housing to provide representative audio signals from vocal sounds;

a wireless transceiver fixed to the housing and coupled to the earphone and the microphone, communicating with the central station and through the public switched telephone network, to select remote stations for outgoing calls;

a voice-recognition structure to convert voice signals representative of spoken numbers to dial-up signals; and a control unit for sequencing the operation of the wireless transceiver to selectively transmit either representative voice audio signals or numerical dial-up signals to attain communication with a remote station.

16. A wireless, keyless telephone instrument according to claim 15 wherein said control unit operates with a manual switch to select transmission of either representative voice audio signals or numerical dial-up signals.

17. A wireless, keyless telephone instrument for prepaid and discardable use with an approving central station capable of bridging to a public switched telephone network for communication by the wireless, keyless telephone instrument with remote stations, said wireless, keyless telephone instrument consisting of:

a housing defining an interior space;

an earphone fixed to the housing to provide represented vocal sounds from audio signals;

a microphone structure fixed to the housing to provide representative audio signals from vocal sounds;

a wireless transceiver fixed to the housing and coupled to the earphone and the microphone, communicating with the central station and through the public switched telephone network, to select remote stations;

a voice-recognition structure to convert voice signals representative of spoken numbers to dial-up signals; and a control unit including a phase register to indicate a plurality of operating phases, including voice conversation communication and numerical signal communication.

18. A wireless telephone instrument according to claim 17 wherein said operating phases further include a standby phase for receiving calls.

* * * * *